United States Patent

Itsui

(10) Patent No.: US 12,263,864 B2
(45) Date of Patent: Apr. 1, 2025

(54) MOBILE OBJECT CONTROL DEVICE AND MOBILE OBJECT CONTROL METHOD USING TRAINED RISK MODEL

(71) Applicant: Mitsubishi Electric Corporation, Tokyo (JP)

(72) Inventor: Takayuki Itsui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 310 days.

(21) Appl. No.: 17/432,684

(22) PCT Filed: Mar. 12, 2019

(86) PCT No.: PCT/JP2019/010007
§ 371 (c)(1),
(2) Date: Aug. 20, 2021

(87) PCT Pub. No.: WO2020/183609
PCT Pub. Date: Sep. 17, 2020

(65) Prior Publication Data
US 2022/0169277 A1    Jun. 2, 2022

(51) Int. Cl.
*B60W 60/00*        (2020.01)
*G06V 10/764*      (2022.01)
(Continued)

(52) U.S. Cl.
CPC .......... *B60W 60/00* (2020.02); *G06V 10/764* (2022.01); *G06V 20/58* (2022.01);
(Continued)

(58) Field of Classification Search
None
See application file for complete search history.

(56) References Cited

U.S. PATENT DOCUMENTS

| 10,592,634 B1 * | 3/2020 | Baranwal | G06N 5/045 |
| 2011/0235900 A1 * | 9/2011 | Porikli | G06F 16/51 |
| | | | 382/159 |

(Continued)

FOREIGN PATENT DOCUMENTS

| CN | 107945574 A | 4/2018 |
| EP | 2 990 899 A1 | 3/2016 |

(Continued)

OTHER PUBLICATIONS

Axel Sauer et al., "Conditional Affordance Learning for Driving in Urban Environments", 2nd Conference on Robot Learning (CoRL2018), Nov. 3, 2018, pp. 1-16.

(Continued)

*Primary Examiner* — James J Lee
*Assistant Examiner* — Tawri M McAndrews
(74) *Attorney, Agent, or Firm* — Sughrue Mion, PLLC (57) ABSTRACT

A mobile object control device acquires, as learning history data, driving history data obtained when a learning mobile object is operated in a risk-free environment; performs learning for imitating driving of the learning mobile object in the risk-free environment using the learning history data as training data and generates an imitation learning model; acquires, as training history data, driving history data obtained when a mobile object for generating training data is operated in the same environment as the environment in which the learning history data has been acquired; estimates whether the training history data matches the learning history data using the training history data as input to the imitation learning model and assigns a label related to risks; and infers a result for controlling a mobile object to be controlled using at least the label related to risks as training data, based on sensor information of the mobile object.

11 Claims, 5 Drawing Sheets

(51) Int. Cl.
*G06V 20/58* (2022.01)
*B60W 50/00* (2006.01)

(52) U.S. Cl.
CPC ............ *B60W 2050/0062* (2013.01); *B60W 2554/402* (2020.02); *B60W 2556/10* (2020.02)

(56) References Cited

U.S. PATENT DOCUMENTS

| | | | |
|---|---|---|---|
| 2018/0075309 A1* | 3/2018 | Sathyanarayana | G05D 1/0055 |
| 2018/0164825 A1* | 6/2018 | Matus | B60W 30/00 |
| 2018/0370502 A1* | 12/2018 | Wang | B60T 8/174 |
| 2019/0042953 A1* | 2/2019 | Duesterwald | G06F 18/214 |
| 2019/0197323 A1 | 6/2019 | Sakai et al. | |
| 2019/0251374 A1 | 8/2019 | Sakai et al. | |
| 2019/0344798 A1 | 11/2019 | Motomura et al. | |
| 2019/0344803 A1 | 11/2019 | Sakai et al. | |
| 2020/0033868 A1* | 1/2020 | Palanisamy | G06N 3/08 |
| 2020/0209858 A1* | 7/2020 | Trofymov | G05D 1/024 |

FOREIGN PATENT DOCUMENTS

| | | |
|---|---|---|
| JP | 5035040 B2 | 9/2012 |
| JP | 2018-135068 A | 8/2018 |
| WO | 2014/174656 A1 | 10/2014 |
| WO | 2018/066712 A1 | 4/2018 |

OTHER PUBLICATIONS

International Search Report for PCT/JP2019/010007 dated, Jun. 18, 2019 (P{CT/ISA/210).

Office Action issued Jul. 29, 2022 in Chinese Application No. 201980093642.1.

Communication dated Jul. 27, 2021 from the Japanese Patent Office in Application No. 2021-504677.

* cited by examiner

MOBILE OBJECT CONTROL DEVICE AND MOBILE OBJECT CONTROL METHOD USING TRAINED RISK MODEL

CROSS REFERENCE TO RELATED APPLICATIONS

This application is a National Stage of International Application No. PCT/JP2019/010007 filed Mar. 12, 2019.

TECHNICAL FIELD

The present invention relates to technology for estimating the situation around a mobile object and controlling the mobile object on the basis of the estimation result.

BACKGROUND ART

In order to automatically control the travel of a mobile object technology for controlling the travel of the mobile object while estimating the situation around the mobile object is required. The technology of autonomous driving control of automobiles is a typical example.

For example, Non-Patent Literature 1 discloses technology for estimating the situation surrounding a mobile object such as the presence or absence of an obstacle located ahead of the mobile object by inputting an image by a front camera of the mobile object to a neural network using an open-source autonomous driving simulator (CARLA). Another technology is also disclosed which operates an emergency brake of a mobile object for a tangible risk included in an estimated situation surrounding the mobile object.

CITATION LIST

Non-Patent Literature

Non-Patent Literature 1: Axel Saner, Nikolay Savinov, Andreas Geiger, "Conditional Affordance Learning for Driving in Urban Environments"

SUMMARY OF INVENTION

Technical Problem

In a case of autonomous driving of automobiles, in actual driving of an automobile, it is necessary to drive with consideration to not only tangible risks but also potential risks such as a person running out into a road. Thus, as in the technology disclosed in Non-Patent Literature 1, it is necessary to learn a cognitive model including potential risks in a case of driving on the basis of a cognitive result obtained by inputting sensor information, such as images by a front camera of a mobile object, to a cognitive model. However, there is a problem that it is difficult to learn a cognitive model with respect to potential risks. There is another problem that it is difficult to define all the ideal behaviors of a mobile object with respect to potential risks.

The present invention has been made to solve the above-mentioned problems, and an object of the invention is to perform learning for determining risks while saving labor in, assigning identification information when training data for determining risks including potential risks is generated in learning of a cognitive model.

Solution to Problem

A mobile object control device according to the present invention includes: processing circuitry configured to acquire, as learning history data, driving history data obtained when a learning mobile object is operated in a risk-free environment; perform learning for imitating driving of the learning mobile object in the risk-free environment using the acquired learning history data as training data and generating an imitation learning model; acquire, as training history data, driving history data obtained when a mobile object for generating training data is operated in a same environment as the environment in which the learning history data has been acquired; estimate whether the training history data matches the learning history data using the acquired training history data as input to the generated imitation learning model and assign a label related to a risk; and learn a model for inferring a result for controlling a mobile object to be controlled using at least the assigned label related to the risk as training data, on a basis of sensor information of a sensor mounted on the mobile object to be controlled.

Advantageous Effects of Invention

According to the present invention, it is possible to perform learning for determining risks while saving labor in assigning identification information when training data for determining risks including potential risks is generated in learning of a cognitive model.

DESCRIPTION OF EMBODIMENTS

To describe the present invention further in detail, embodiments for carrying out the present invention will be described below with reference to the accompanying drawings.

First Embodiment

Figure 1:
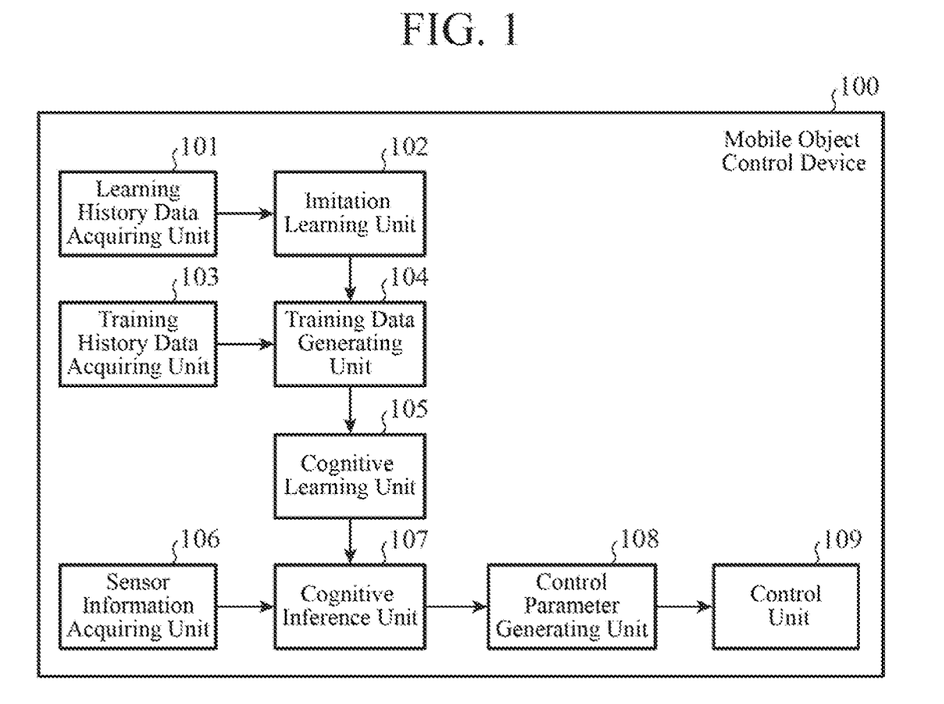
FIG. 1 is a block diagram illustrating a configuration of a mobile object control device according to a first embodiment.

FIG. 1 is a block diagram illustrating the configuration of a mobile object control device 100 according to a first embodiment.

The mobile object control device 100 includes a learning history data acquiring unit 101, an imitation learning unit 102, a training history data acquiring unit 103, a training data generating unit 104, a cognitive learning unit (learning unit) 105, a sensor information acquiring unit 106, a cognitive inference unit 107, a control parameter generating unit 108, and a control unit 109.

The learning history data acquiring unit 101 acquires, as learning history data, driving history data of a learning mobile object that is obtained when the learning mobile object is driven in a risk-free environment. Risks include, for example, tangible risks, potential risks, and various types of other risks.

A tangible risk is, for example, an obstacle. A potential risk is, for example, a collision due to a person or a bicycle running out into a road on which a vehicle is traveling or as collision due to a sharp curve of a road. A risk-free environment is obtained, for example, in a simulator environment or in a real test course in which potential risks are eliminated.

The learning history data includes a set of sensor information of the learning mobile object and mobile object control parameters.

The sensor information of the learning mobile object is, for example, image data associated with a time stamp, LiDAR data, millimeter-wave radar data, or ultrasonic sensor data. The sensor information of the learning mobile object may include a combination of various types of sensor information.

The mobile object control parameters are, for example, a parameter for controlling the accelerator opening degree, a parameter for controlling the brake opening degree, and a parameter for controlling the steering wheel angle of the learning mobile object.

The learning history data acquiring unit 101 outputs the learning history data that has been acquired to the imitation learning unit 102.

The imitation learning unit 102 performs learning for imitating the driving of the learning mobile object in a risk-free environment using the learning history data input from the learning, history data acquiring unit 101 as training data. The imitation learning unit 102 generates an imitation learning model from the learning. The mutation learning unit 102 outputs the generated imitation learning model to the training data generating unit 104. As the learning algorithm in the imitation learning unit 102, for example, supervised learning and inverse reinforcement learning are applicable. Note that the learning algorithm is not limited to those described above.

The training history data acquiring unit 103 acquires, as training history data, driving history data of a mobile object for generating training data that is obtained when the mobile object for generating training data is travelled in the same environment as the environment in which the learning history data has been acquired. The training history data includes a set of sensor information of the mobile object for generating training data and mobile object control parameters.

The sensor information of the mobile object for generating training data is, for example, image data associated with a time stamp, LiDAR data, millimeter-wave radar data, or ultrasonic senor data. The sensor information of the mobile object for generating training data may include a combination of various types of sensor information.

The mobile object control parameters are, for example, a parameter for controlling the accelerator opening degree, a parameter for controlling the brake opening degree, and a parameter for controlling the steering wheel angle of the mobile object for generating training data.

The training history data acquiring unit 103 outputs the training history data that has been acquired to the training data generating unit 104.

The training data generating unit 104 estimates whether not the training history data matches the learning history data using the training history data input from the training history data acquiring unit 103 as input to the imitation learning model input from the imitation learning unit 102. More specifically, the training data generating unit 104 estimates the matching degree that indicates whether the training history data matches the learning history data. The data generating unit 104 assigns a label, which is identification information regarding risks, to the sensor information of the mobile object for generating training data that is included in the training history data on the basis of the matching degree that has been estimated. A label related to risks is a risk label indicating that there is a risk or a risk-free label indicating that there is no risk.

The training data generating unit 104 generates a cognitive label other than the label related to risks using the training history data input from the training history data acquiring unit 103. Here, a cognitive label indicates the position information of other vehicles, information of signs to be followed, information of the color of a traffic light, and position information of the host vehicle with respect to a target lane. The training data generating unit 104 outputs a set of the sensor information of the training history data, the label related to risks, and the cognitive label to the cognitive learning unit 105.

For example, in a case where generative adversarial imitation learning (GAIL), which is one of inverse reinforcement learning algorithms, is used as a learning algorithm for imitating the driving of the learning mobile object, the degree how much the driving history data of the mobile object for generating training data can be deemed as the driving history data of the learning mobile object is estimated by adversarial learning using discriminator for outputting the degree how much it is possible to deem as the driving history data of the learning mobile object and a discriminator obtained as a result of competition and learning of rules of conduct for imitating the learning mobile object.

The cognitive learning unit 105 learns a cognitive model using a set of the sensor information of the training history data, the label, related to risks, and the cognitive label, which is input from the training data generating unit 104 as training data. The cognitive learning unit 105 learns a cognitive model for inferring a cognitive result in the cognitive inference unit 107 described later when the sensor information acquired by the sensor information acquiring unit 106 described later is input. Here, the cognitive result inferred by the cognitive model includes at least a result indicating the presence or absence of a risk when the mobile object travels. The cognitive result may further include results indicating the position information of other vehicles, information of signs to be followed, information of the color of a traffic light, and position information of the host vehicle with respect to a target lane. The cognitive learning unit 105 outputs, to the cognitive inference unit 107, model parameters of the cognitive model that has been learned.

The sensor information acquiring unit 106 acquires sensor information input from a sensor mounted on a mobile object to be controlled by the mobile object control device 100. The sensor information of the mobile object to be controlled is, for example, image data associated with a time stamp, LiDAR data, millimeter-wave radar data, or ultrasonic sensor data. The sensor information of the mobile object to be controlled may include a combination of various types of sensor information.

The sensor information acquiring unit 106 processes the acquired sensor information into a data format suitable for processes by the cognitive inference unit 107, which will be described later. As processing of the sensor information, there are format conversion and data shaping. Furthermore, the processing of the sensor information is not limited to simple conversion. For example, in a case where the sensor information is image data, a semantic segmentation process may be performed to perform conversion into image data in which areas are divided by classification into classes for each pixel. The sensor information acquiring unit 106 outputs the sensor information that has been processed to the cognitive inference unit 107.

The cognitive inference unit 107 infers a cognitive result by inputting the sensor information of the mobile object to be controlled that has been processed by the sensor information acquiring unit 106 into the cognitive model based on the model parameters input from the cognitive learning unit 105. The cognitive inference unit 107 infers a cognitive result indicating at least whether or not there is a risk associated with the travel of the mobile object to be controlled. The cognitive inference unit 107 may further infer a cognitive result indicating the position information of other vehicles, information of signs to be followed, information of the color of a traffic light, and position information of the host vehicle with respect to a target lane. The cognitive inference unit 107 outputs the cognitive result that has been inferred to the control parameter generating unit 108.

The control parameter generating unit 108 generates control parameters of the mobile object to be controlled on the basis of the cognitive result input from the cognitive inference unit 107. The control parameter generating unit 108 generates, for example, at parameter for controlling the accelerator opening degree, a parameter for controlling the brake opening degree, and a parameter for controlling the steering wheel angle of the mobile object to be controlled. In addition, the control parameter generating unit 108 generates a mobile object control parameter for avoiding a risk at a place where a cognitive result indicating the risk has been inferred. The control parameter generating unit 108 outputs the mobile object control parameters that have been generated to the control unit 109.

The control unit 109 controls the mobile object to be controlled on the basis of the mobile object control parameters input from the control parameter generating unit 108.

Next, a hardware configuration example of the mobile object control device 100 will be described.

Figure 2A:
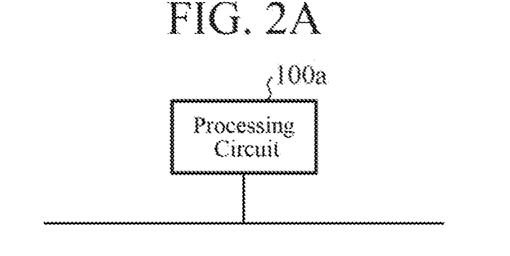
FIGS. 2A and 2B are diagrams each illustrating an exemplary hardware configuration of the mobile object control device according to the first embodiment.
Figure 2B:
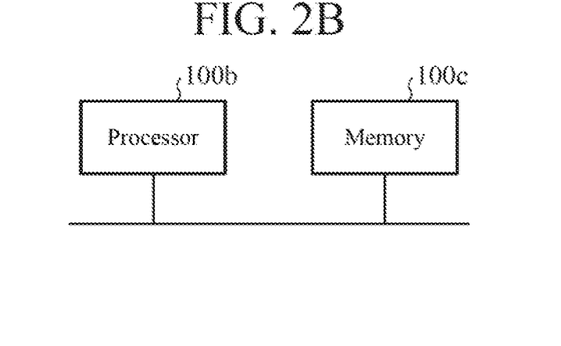

FIGS. 2A and 2B are diagrams each illustrating an exemplary hardware configuration of the mobile object control device 100 according to the first embodiment.

The functions of the learning history data acquiring unit 101, the imitation learning unit 102, the training history data acquiring unit 103, the training data generating unit 104, the cognitive learning unit 105, the sensor information acquiring unit 106, the cognitive inference unit 107, the control parameter generating unit 108, and the control unit 109 in the mobile object control device 100 are implemented by a processing circuit. That is, the mobile object control device 100 includes it processing circuit for implementing the above functions. The processing circuit may be a processing circuit 100a which is dedicated hardware as illustrated in FIG. 2A or may be a processor 100b for executing programs stored in a memory 100c as illustrated in FIG. 2B.

In the case where the learning history data acquiring unit 101, the imitation learning unit 102, the training history data acquiring unit 103, the training data generating unit 104, the cognitive learning unit 105, the sensor information acquiring unit 106, the cognitive inference unit 107, the control parameter generating unit 108, and the control unit 109 are implemented by dedicated hardware as illustrated in FIG. 2A, the processing circuit 100a corresponds to, for example, a single circuit, a composite circuit, a programmed processor, a parallel-programmed processor, an application specific integrated circuit (ASIC), a field-programmable gate array (FPGA), or a combination thereof. The functions of the learning history data acquiring unit 101, the imitation learning unit 102, the training history data acquiring unit 103, the training data generating unit 104, the cognitive learning unit 105, the sensor information acquiring unit 106, the cognitive inference unit 107, the control parameter generating unit 108, and the control unit 109 may be each implemented by a processing circuit, or the functions of the respective units may be collectively implemented by a single processing circuit.

As illustrated in FIG. 2B, in the case where the learning history data acquiring unit 101, the imitation learning unit 102, the training history data acquiring unit 103, the training data generating unit 104, the cognitive learning unit 105, the sensor information acquiring unit 106, the cognitive inference unit 107, the control parameter generating unit 108, and the control unit 109 are implemented by the processor 100b, the functions of the respective units are implemented by software, firmware, or a combination of software and firmware. The software or the firmware is described as programs, which are stored in the memory 100c. By rending and executing the programs stored in the memory 100c, the processor 100b implements each function of the learning history data acquiring unit 101, the imitation learning unit 102, the training history data acquiring unit 103, the training data generating unit 104, the cognitive learning unit 105, the sensor information acquiring unit 106, the cognitive inference unit 107, the control parameter generating unit 108, and the control unit 109. That is, the learning history data acquiring unit 101, the imitation learning unit 102, the training history data acquiring unit 103, the training data generating unit 104, the cognitive learning unit 105, the sensor information acquiring unit 106, the cognitive inference unit 107, the control parameter generating unit 108, and the control unit 109 include the memory 100c for storing the programs, execution of which by the processor 100b results in execution of each step illustrated in FIGS. 3, 4, 6, and 7 described later. In addition, these programs cause a computer to execute the procedures or methods of the learning history data acquiring unit 101, the imitation learning unit 102, the training history data acquiring unit 103, the training data generating unit 104, the cognitive learning unit 105, the sensor information acquiring unit 106, the cognitive inference unit 107, the control parameter generating unit 108, and the control unit 109.

Here, the processor 100b is, for example, a central processing unit (CPU), a processing device, an arithmetic device, a processor, a microprocessor, a microcomputer, or a digital signal processor (DSP).

The memory 100c may be a nonvolatile or volatile semiconductor memory such as a random access memory (RAM) a read only memory (ROM) a flash memory, an erasable programmable ROM (EPROM), an electrically EPROM (EEPROM), a magnetic disk such as a hard disk or a flexible disk, or an optical disk such as a mini disk, a compact disc (CD), or a digital versatile disc (DVD).

The functions of the learning history data acquiring unit 101, the imitation learning unit 102, the training history data acquiring unit 103, the training data generating unit 104, the cognitive learning unit 105, the sensor information acquiring unit 106, the cognitive inference unit 107, the control parameter generating unit 103, and the control unit 109 may be partly implemented by dedicated hardware and partly implemented by software or firmware. In this manner, the processing circuit 100a in the mobile object control device 100 can implement the above functions by hardware, software, firmware, or a combination thereof.

Next, the operation of the mobile object control device 100 will be described.

The operation of the mobile object control device 100 will be described separately for a generation process of a cognitive model and a control process of a mobile object to be controlled.

First, the generation process of a cognitive model will be described with reference to FIG. 3.

Figure 3:
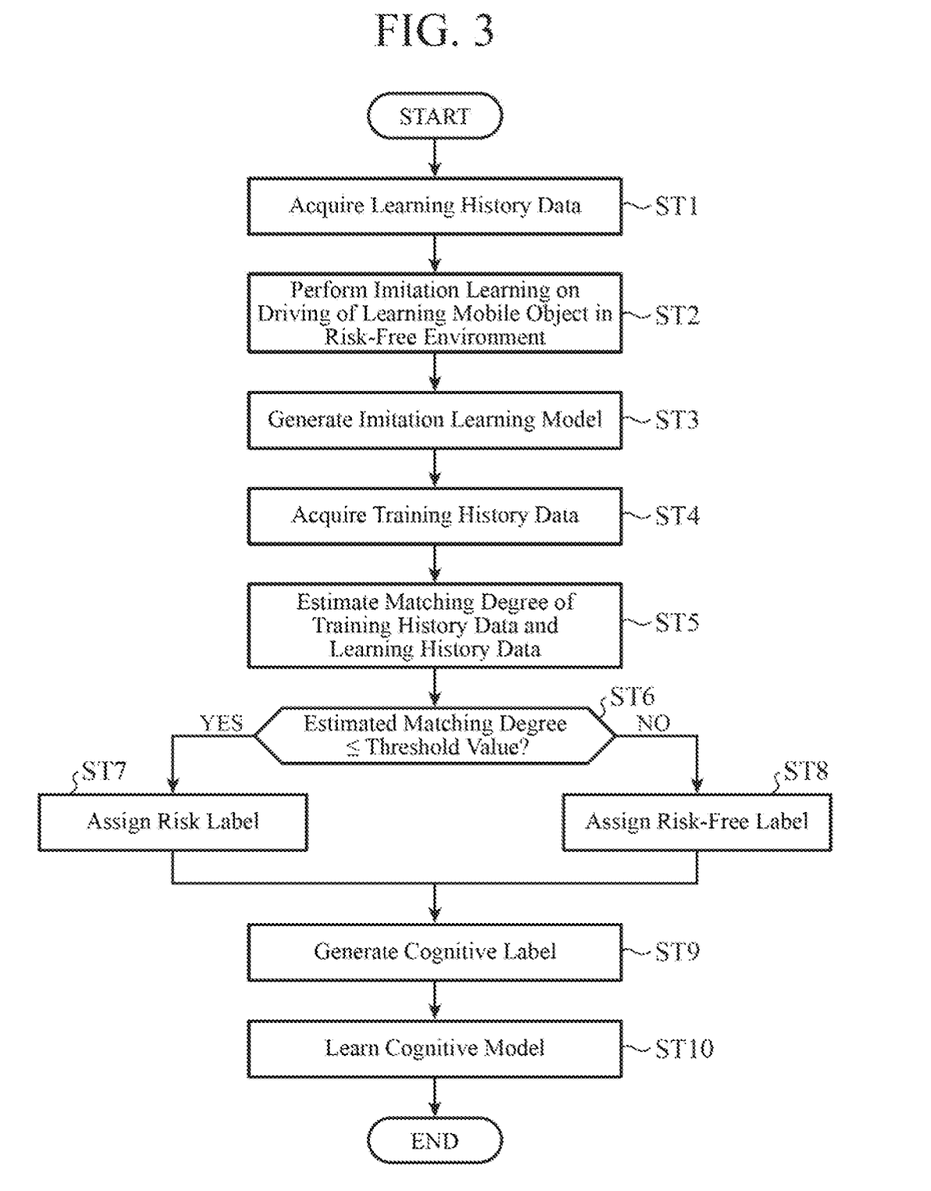
FIG. 3 is a flowchart illustrating the operation of a generation process of a cognitive model of the mobile object control device according to the first embodiment.

FIG. 3 is a flowchart illustrating the operation of a generation process of a cognitive model of the mobile object control device 100 according to the first embodiment.

The learning history data acquiring unit 101 acquires learning history data (step ST1) and outputs the learning history data to the imitation learning unit 102. The imitation learning unit 102 performs learning for imitating the driving of the learning mobile object in a risk-free environment using the learning history data input from the learning history data acquiring unit 101 as naming data (step ST2). The imitation learning unit 102 generates an imitation learning model on the basis of the learning in step ST2 (step ST3). The imitation learning unit 102 outputs the imitation learning model generated in step ST3 to the training data generating unit 104.

The training history data acquiring unit 103 acquires training history data (step ST4) and outputs the training history data to the training data generating unit 104. The training data generating unit 104 inputs the training history data input from the training history data acquiring unit 103 to the imitation learning model input from the imitation learning unit 102 and estimates the matching degree of the training history data and the learning history data (step ST5). The training data generating unit 104 determines whether or not the matching degree estimated in step ST5 is less than or equal to a threshold value (step ST6).

If the matching degree that has been estimated is less than or equal to the threshold value (step ST6: YES), it is determined that the mobile object for generating training data is in a driving state in consideration of risks, and a risk label is assigned (step ST7). On the other hand, if the matching degree that has been estimated is not less than or equal to the threshold value (step ST6: NO), it is determined that the mobile object for generating training data is not in a driving state in consideration of risks, and a risk-free label is assigned (step ST8). The training data generating unit 104 generates a cognitive label using the training history data (step ST9).

The training data generating unit 104 outputs, to the cognitive learning unit 105, a set of the sensor information of the training history data, the label related to risks assigned in step ST7 or step ST8, and the cognitive label generated in step ST9. The cognitive learning unit 105 learns a cognitive model using a set of the sensor information of the tanning history data, the label related to risks, and the cognitive label, which is input from the training data generating unit 104 as training data (step ST10). The cognitive learning unit 105 outputs model parameters of the cognitive model that has been leaned to the cognitive inference unit 107 and ends the process.

Next, the operation of the control process of the mobile object to be controlled will be described with reference to FIG. 4.

Figure 4:
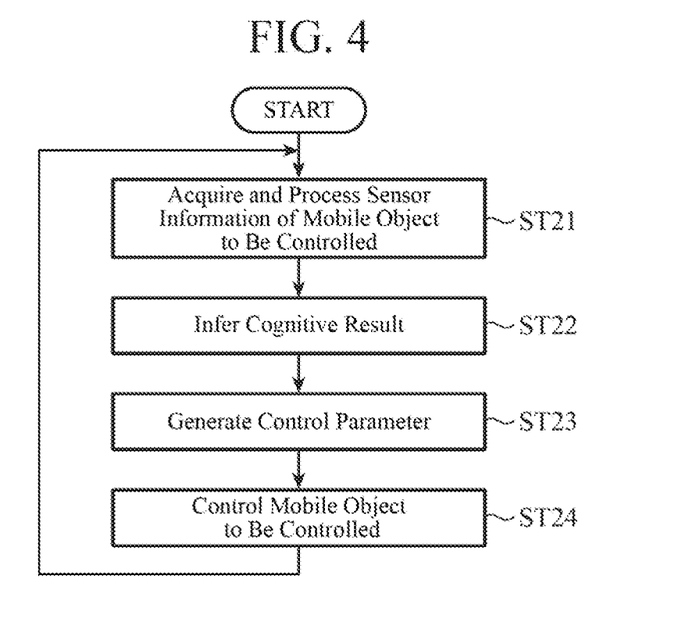
FIG. 4 is a flowchart illustrating the operation of a control process of a mobile object with the mobile object control device according to the first embodiment.

FIG. 4 is a flowchart illustrating the operation of a control process of a mobile object by the mobile object control device 100 according to the first embodiment.

The sensor information acquiring unit 106 acquires and processes the sensor information of the mobile object to be controlled (step ST21). The sensor information acquiring unit 106 outputs the sensor information that has been processed to the cognitive inference unit 107. The cognitive inference unit 107 infers a cognitive result by inputting the sensor information that has been processed and input by the sensor information acquiring unit 106 into the cognitive model based on the model parameters input from the cognitive learning unit 105 (step ST22). The cognitive inference unit 107 outputs the cognitive result that has been inferred to the control parameter generating unit 108.

The control parameter generating unit 108 generates control parameters of the mobile object to be controlled on the basis of the cognitive result input from the cognitive inference unit 107 (step ST23). The control parameter generating unit 108 outputs the control parameters, of the mobile object to be controlled, which have been generated to the control unit 109. The control unit 109 controls the mobile object to be controlled on the basis of the control parameters input from the control parameter generating unit 108 (step ST24). Then, the flowchart returns to the process of step ST21, and the processes described above are repeated.

In the above, the training data generating unit 104 assigns the label related to risks on the basis of a matching degree that has been estimated. The training data generating unit 104 may further classify the type of risk when a risk label is assigned.

When classifying the type of risk, the training data generating unit 104 performs unsupervised learning using sensor information assigned with a risk label and classifies the risk into preset types. The training data generating unit 104 assigns a label that allows the type to be identified for each of the classified risk types. The types for classifying risks are, for example, a collision upon turning left at an intersection, a collision upon turning right at an intersection, a collision upon going straight at an intersection, a collision due to running out from an obstacle on the left side of the road, a collision due to running out from an obstacle on the right side of the road, and a collision at a sharp curve. Note that the above-mentioned types for classifying risks are one example, and various types for classifying risks can be set.

In a case where the training data generating unit 104 has assigned a risk label and classified the type of the risk, the training data generating unit 104 outputs a set of the sensor information of the training history data, a label that allows the type of the risk to be identified, and the cognitive label to the cognitive learning unit 105. Note that in a case where a risk-free label is assigned, the training data generating unit 104 outputs a set of the sensor information of the training history data, the risk-free label, and the cognitive label to the cognitive learning unit 105.

The cognitive learning unit 105 learns a cognitive model for inferring a cognitive result depending on the type of risk using a set of the sensor information of the training history data, the label that allows the type of risk to be identified, and the cognitive label as training data. The cognitive inference unit 107 infers at least a cognitive result indicating the presence or absence of a risk associated with the travel of the mobile object to be controlled and a cognitive result indicating the type of risk in a case where there is a risk. The control parameter generating unit 108 generates control parameters depending on the type of the risk in a case where the cognitive result indicating the type of the risk has been input.

As described above, according to the first embodiment, included are: the learning history data acquiring unit 101 for acquiring as learning history data, driving history data obtained when a learning mobile object is driven in a risk-free environment; the imitation learning unit 102 for generating an imitation learning model by performing learning for imitating driving of the learning mobile object in the risk-free environment using the learning history data as training data; the training history data acquiring unit 103 for acquiring, as training history data, driving history data obtained when a mobile object for generating training data is driven in the same environment as the environment in which the learning history data has been acquired; the training data generating unit 104 for assigning a label related to risks by estimating whether or not the training history data matches the learning history data using the training history data as input to the imitation learning model; and the cognitive learning unit 105 for learning a cognitive model for inferring a result for controlling a mobile object to be controlled using at least the label related to risks as training data, on the basis of sensor information of a sensor mounted on the mobile object to be controlled.

As a result, in learning a cognitive model, it is possible to save labor in assigning identification information when training data for determining risks including potential risks is generated.

Moreover, according to the first embodiment, the cognitive learning unit 105 learns a cognitive model for inferring a cognitive result including at least a result indicating the presence or absence of a risk using the training history data and a label related to risks as training data, therefore, it is possible to learn a model that enables determination of the presence or absence of risks including potential risks.

Furthermore, the first embodiment includes: the cognitive inference unit 107 for inferring a cognitive result indicating at least the presence or absence of a risk associated with the travel of the mobile object to be controlled by inputting sensor information of the mobile object to be controlled into a cognitive model; and the control parameter generating unit 108 for generating control parameters of the mobile object to be controlled on the basis of the cognitive result that has been inferred, and thus it is possible to determine the presence or absence of risks including potential risks. In addition, it is possible to control the mobile object on the basis of the presence or absence of risks including potential risks.

Further according to the first embodiment, the training data generating unit 104 performs unsupervised learning using the sensor information of the training history data assigned with a label indicating that there is a risk as a label related to risks, classifies the risk into preset types, and assigns a label that allows the type of the risk that has been classified to be identified, and the cognitive learning unit 105 learns a cognitive model for inferring a cognitive result depending on the type of the risk using the label that allows the type of the risk to be identified as training data.

As a result, a cognitive result depending on the type of risk can be inferred, and control parameters depending on the type of the risk can be generated.

Second Embodiment

In a second embodiment, a configuration for inferring a control parameter of a mobile object with a focus on risks is illustrated.

Figure 5:
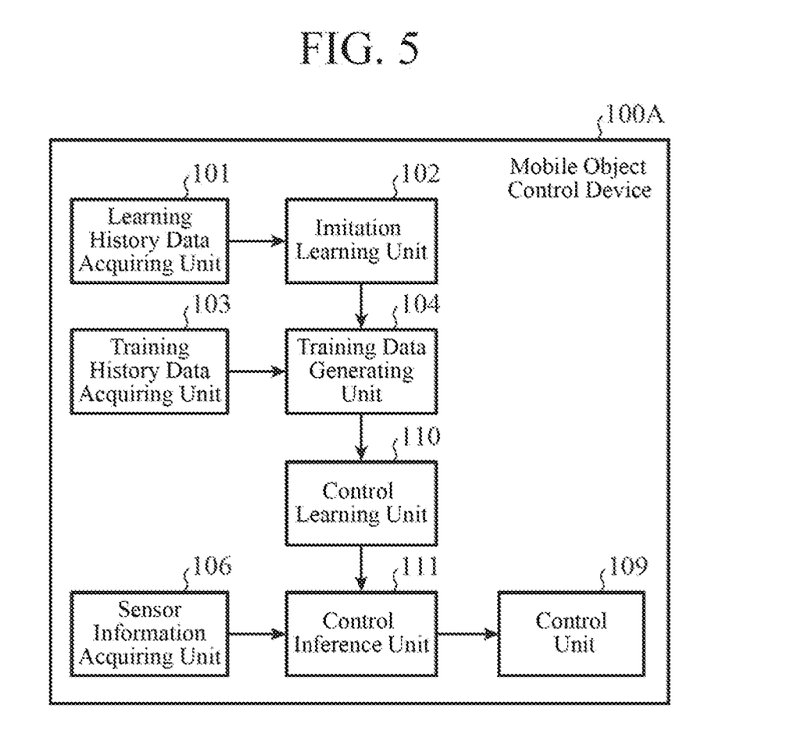
FIG. 5 is a block diagram illustrating a configuration of a mobile object control device according to a second embodiment.

FIG. 5 is a block diagram illustrating the configuration of a mobile object control device 100A according to the second embodiment.

The mobile object control device 100A of the second embodiment includes a control learning unit (learning unit) 110 and a control inference unit 111 in place of the cognitive learning unit 105, the cognitive inference unit 107, and the control parameter generating unit 108 of the mobile object control device 100 described in the first embodiment. Note that, in the following description, the same symbol as that used in the first embodiment is provided to the same or a corresponding component as that of the mobile object control device 100 according to the first embodiment, and explanation thereof is omitted or simplified.

The training data generating unit 104 estimates whether training history data matches learning history data as in the first embodiment. The training data generating unit 104 assigns a label related to risks on the basis of the matching degree that has been estimated. The training data generating unit 104 outputs a set of sensor information of the training history data, the label related to risks, and mobile object control parameters of the training history data to the control learning unit 110.

The control learning unit 110 learns a control model using a set of the sensor information of the training history data, the label related to risks, and the mobile object control parameters of the training history data, which is input from the training data generating unit 104 as training data. The control learning unit 110 learns a control model for interring a label related to risks and mobile object control parameters in a case where sensor information acquired by the sensor information acquiring unit 106 is input.

In learning of a control model by the control learning unit 110, inference of mobile object control parameters is primary, and inference of a label relined to risks is auxiliary. The control learning unit 110 can learn a control model for inferring mobile object control parameters focusing on risks by including the inference of the label related to risks as auxiliary inference. The control learning unit 110 outputs the model parameters of the control model that has been learned to the control inference unit 111.

The sensor information acquiring unit 106 processes sensor information acquired from a sensor mounted on a mobile object to be controlled into a data format suitable for processing by the control inference unit 111, which will be described later.

The control inference unit 111 inputs the sensor information of the mobile object to be controlled processed by the sensor information acquiring unit 106 into the control model based on the model parameters input from the control learning unit 110. The control inference unit 111 infers the label related to risks and control parameters of the mobile object to be controlled. The control inference unit 111 outputs the inferred control parameter of the mobile object to be controlled to the control unit 109.

The control unit 109 controls the mobile object to be controlled on the basis of the control parameter input from the control inference unit 111.

A hardware configuration example of the mobile object control device 100A will be described. Note that description of the same configuration as that of the first embodiment is omitted. The control learning unit 110 and the control inference unit 111 in the mobile object control device 100 are implemented by the processing circuit 100a illustrated in FIG. 2A or the processor 100b that executes a program stored in the memory 100c illustrated in FIG. 2B.

Next, the operation of the mobile object control device 100A will be described. Like in the first embodiment, the operation of the mobile object control device 100A will be described separately for a generation process of a control model and a control process of a mobile object to be controlled.

Figure 6:
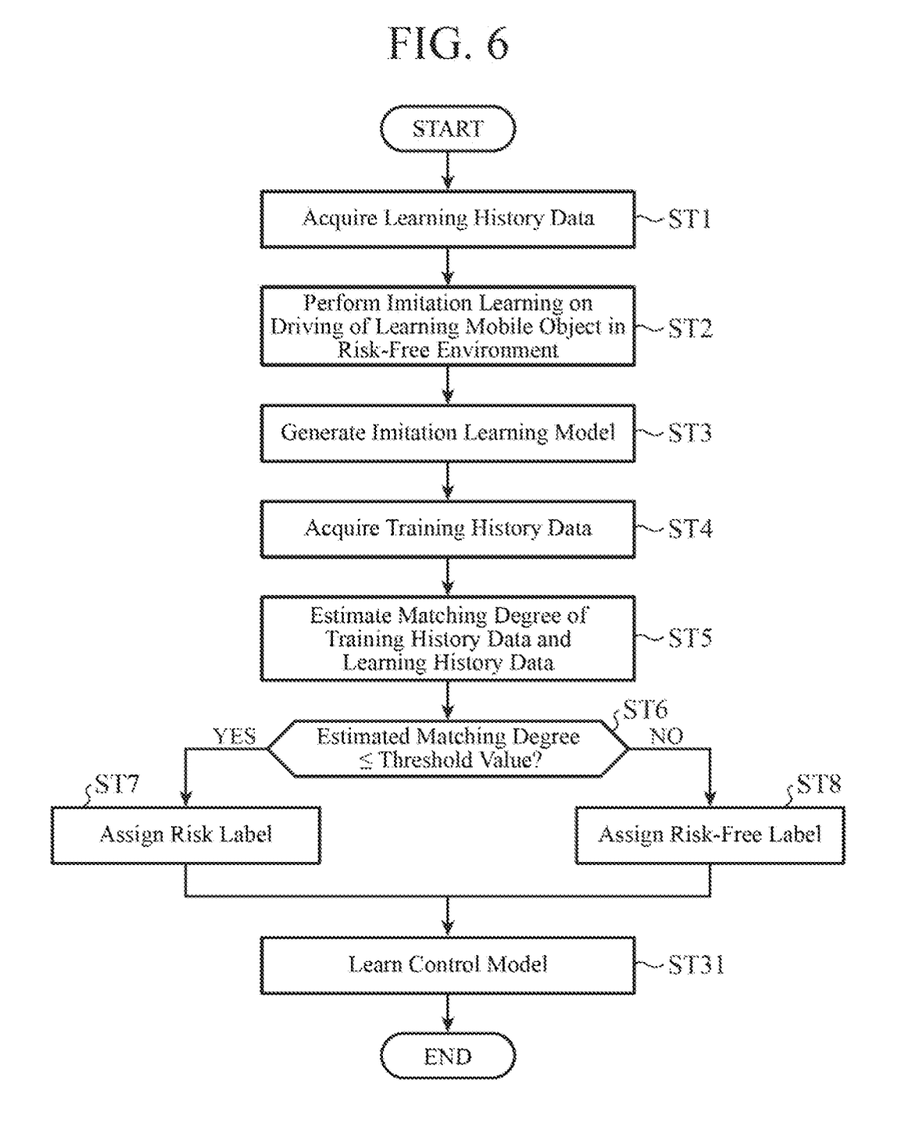
FIG. 6 is a flowchart illustrating the operation of a generation process of a cognitive model, with the mobile object control device according to the second embodiment.
Figure 7:
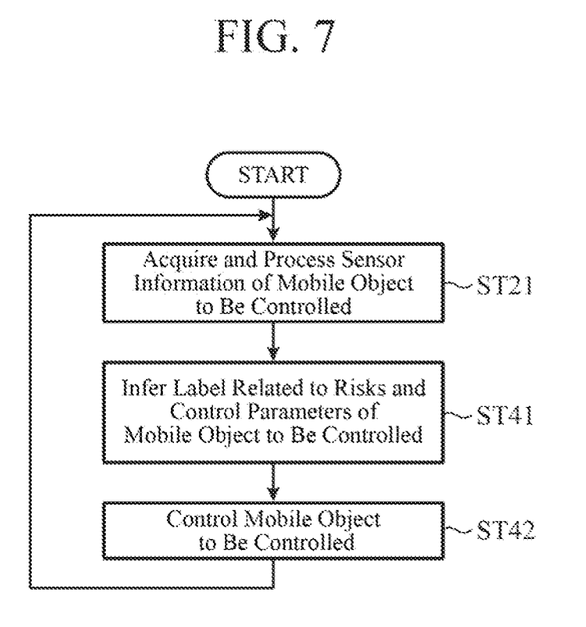
FIG. 7 is a flowchart illustrating the operation of a control process of a mobile object with the mobile object control device according to the second embodiment.

FIGS. 6 and 7 are flowcharts illustrating the operation of the mobile object control device 100A according to the second embodiment. In FIGS. 6 and 7, the same step as that in the flowchart of the first embodiment illustrated in FIGS. 3 and 4 is denoted with the same symbol, and description thereof will be omitted.

FIG. 6 is a flowchart illustrating the operation of a generation process of a control model of the mobile object control device 100A according to the second embodiment.

When a label related to risks has been assigned in step ST7 or step ST8, the training data generating unit 104 outputs a set of the sensor information of the training history data, the label related, to risks, and the mobile object control parameters of the training history data to the control inference unit 111. The control learning unit 110 learns a control model using a set of the sensor information of the training history data, the label related to risks, and the mobile object control parameters of the training history data, which is input from the training data generating unit 104 as training data (step ST31). The control learning unit 110 outputs the model parameters of the control model that has been learned to the control inference unit 111 and ends the process.

FIG. 7 is a flowchart illustrating the operation of a control process of a mobile object by the mobile object control device 100A according to the second embodiment.

The sensor information acquiring unit 106 acquires and processes the sensor information of the mobile object to be controlled (step ST21). The sensor information acquiring unit 106 outputs the sensor information that has been processed to the control inference unit 111. The control inference unit 111 inputs the sensor information that has been processed and input from the sensor information acquiring unit 106 into the control model based on the model parameters input from the control learning unit 110 and infers the label related to risks and control parameters of the mobile object to be controlled (step ST41). The control inference unit 111 outputs the inferred control parameter of the mobile object to be controlled to the control unit 109.

The control unit 109 controls the mobile object to be controlled on the basis of the mobile object control parameter input from the control inference unit 111 (step ST42). Then, the flowchart returns to the process of step ST21, and the processes described above are repeated.

As described above, according to the second embodiment, included are: the learning history data acquiring unit 101 for acquiring as learning history data driving history data obtained when a learning mobile object is driven in a risk-free environment; the imitation learning unit 102 for generating an imitation learning model by performing learning for imitating driving of the learning mobile object in the risk-free environment using the learning history data as training data; the training history data acquiring unit 103 for acquiring, as training history data, driving history data obtained when a mobile object for generating training data is driven in the same environment as the environment in which the learning history data has been acquired; the training data generating unit 104 for assigning a label related to risks by estimating whether or not the training history data matches the learning history data using the training history data as input to the imitation learning model; and the control learning unit 110 for learning a control model for inferring a result for controlling a mobile object to be controlled using at least the label related to risks as training data, on the basis of sensor information of a sensor mounted on the mobile object to be controlled.

As a result, in learning a control model, it is possible to save labor in assigning identification information when training data for determining risks including potential risks is generated.

Moreover according to the second embodiment, the control learning unit 110 learns a control model for inferring the label related to risks and the control parameters of the mobile object to be controlled using the training history data and the label related to risks as training data, and thus it is possible to learn a model that enables determination of the presence or absence of risks including potential risks and to infer the control parameters of the mobile object focusing on risks.

Furthermore, the second embodiment includes the control inference unit 111 for inferring the label related to risks and the control parameters by inputting the sensor information of the mobile object to be controlled into the control model, and thus it is possible to determine the presence or absence of risks including potential risks. In addition, it is possible to control the mobile object by focusing on risks including potential risks.

In addition to the above, the present invention may include a flexible combination of the embodiments, a modification of any component of the embodiments, or omission of any component in the embodiments within the scope of the present invention.

INDUSTRIAL APPLICABILITY

It is preferable that the technology according to the present invention be applied to, for example, a control system for automatically controlling the travel of a mobile object such as a vehicle in consideration of risks around the mobile object.

REFERENCE SIGNS LIST

100, 100A: mobile object control device, 101: teaming history data acquiring unit, 102: imitation learning unit, 103: training history data acquiring unit, 104: training data generating unit, 105: cognitive learning unit, 106: sensor information acquiring unit, 107: cognitive inference 108: control parameter generating unit, 109: control unit, 110: control learning unit, 111: control inference unit

The invention claimed is:

1. A mobile object control device comprising:
processing circuitry configured to:
acquire, as learning history data, driving history data obtained when a learning mobile object is operated in a collision risk-free environment;
perform learning for imitating driving of the learning mobile object in the collision risk-free environment using the acquired learning history data as training data and generating an imitation learning model;
acquire, as training history data, driving history data obtained when a mobile object for generating training data is operated in a same environment as the environment in which the learning history data has been acquired;
performing a process of automatically labeling the training data by:
  estimating whether the training history data matches the learning history data using the acquired training history data as input to the generated imitation learning model;
  classifying a collision risk into a plurality of collision types based on at least a vehicle travel direction at an intersection and an emerging direction of an obstacle;
  generating a collision risk label and a collision risk-free label by associating the collision risk with corresponding collision types among the plurality of collision types;
  in response to a matching degree between the training history data and the learning history data being less than or equal to a predetermined threshold, determining that the mobile object for generating training data is in a driving state with a collision risk, and assigning the collision risk label to the training data; and
  in response to the matching degree being greater than the predetermined threshold, determining that the mobile object for generating training data is in a collision risk-free driving state, and assigning the collision risk-free label to the training data;
learn a model for inferring vehicle control parameters for controlling a vehicle using the labeled training data that includes the collision risk label or the collision risk-free label, on a basis of sensor information of a sensor mounted on the vehicle; and
control an accelerator, a brake, and a steering wheel of the vehicle using the inferred vehicle control parameters,
wherein the imitation learning model is a different machine learning model from the model for inferring the vehicle control parameters, and the input of the imitation learning model is used to automatically label the training data for the model for inferring the vehicle control parameters.

2. The mobile object control device according to claim 1, wherein the processing circuitry is configured to learn a cognitive model for inferring a cognitive result including at least a result indicating presence or absence of the collision risk using, as training data, the acquired training history data and the collision risk label or the collision risk-free label.

3. The mobile object control device according to claim 2, wherein the processing circuitry is configured to
  input the sensor information of the vehicle into the learned cognitive model and infer the cognitive result indicating at least presence or absence of the collision risk associated with travel of the vehicle; and
  generate the vehicle control parameters based on the inferred cognitive result.

4. The mobile object control device according to claim 3, wherein the processing circuitry is configured to acquire the sensor information of the vehicle, process the sensor information into information suitable for inference of the cognitive result, and output the processed information.

5. The mobile object control device according to claim 2, wherein the processing circuitry is configured to perform unsupervised learning using the sensor information of the training history data assigned with the collision risk label indicating that there is the collision risk, classify the collision risk into preset types, and assign a risk-specific label that causes the type of the classified collision risk to be identifiable, and
the processing circuitry is further configured to learn the cognitive model for inferring the cognitive result depending on the type of the collision risk using the risk-specific label that causes the type of the collision risk to be identifiable as the training data.

6. The mobile object control device according to claim 1, wherein the processing circuitry is configured to learn a control model for inferring the collision risk label or the collision risk-free label and the vehicle control parameters using, as training data, the acquired training history data and the collision risk label or the collision risk-free label.

7. The mobile object control device according to claim 6, wherein the processing circuitry is configured to input the sensor information of the vehicle into the learned control model and infer the collision risk label or the collision risk-free label and the vehicle control parameters.

8. The mobile object control device according to claim 7, wherein the processing circuitry is configured to acquire the sensor information of the vehicle, process the sensor information into information suitable for inference of the collision risk label or the collision risk-free label and the vehicle control parameters, and output the processed information.

9. The mobile object control device of claim 1,
wherein the collision risk is classified into a type of a collision upon turning left at an intersection, a type of a collision upon turning right at an intersection, and a type of a collision upon going straight at an intersection based on the vehicle travel direction at the intersection, and
wherein the collision risk is classified into a type of a collision due to running out from the obstacle on a left side of a road and, a type of a collision due to running out from the obstacle on a right side of a road based on the emerging direction of the obstacle.

10. The mobile object control device of claim 1, wherein the imitation learning model is trained using generative adversarial imitation learning.

11. A mobile object control method comprising:
acquiring, as learning history data, driving history data obtained when a learning mobile object is operated in a collision risk-free environment;
performing learning for imitating driving of the learning mobile object in the collision risk-free environment using the learning history data that has been acquired as training data and generating an imitation learning model;
acquiring, as training history data, driving history data obtained when a mobile object for generating training data is operated in a same environment as the environment in which the learning history data has been acquired;
performing an automatic process of labeling the training data by:
  estimating whether the training history data matches the learning history data using the training history data that has been acquired as input to the imitation learning model that has been generated;
  classifying a collision risk into a plurality of collision types based on at least a vehicle travel direction at an intersection and an emerging direction of an obstacle;

generating a collision risk label and a collision risk-free label by associating the collision risk with corresponding collision types among the plurality of collision types;

in response to a matching degree between the training history data and the learning history data being less than or equal to a predetermined threshold, determining that the mobile object for generating training data is in a driving state with a collision risk, and assigning the collision risk label to the training data;

in response to the matching degree being greater than the predetermined threshold, determining that the mobile object for generating training data is in a collision risk-free driving state, and assigning the collision risk-free label to the training data; and learning a model for inferring vehicle control parameters for controlling a vehicle using the collision risk label or the collision risk-free label as training data, on a basis of sensor information of a sensor mounted on the vehicle; and controlling an accelerator, a brake, and a steering wheel of the vehicle using the inferred vehicle control parameters, wherein the imitation learning model is a different machine learning model from the model for inferring the vehicle control parameters, and the input of the imitation learning model is used to automatically label the training data for the model for inferring the vehicle control parameters.

* * * * *